Patented June 23, 1931

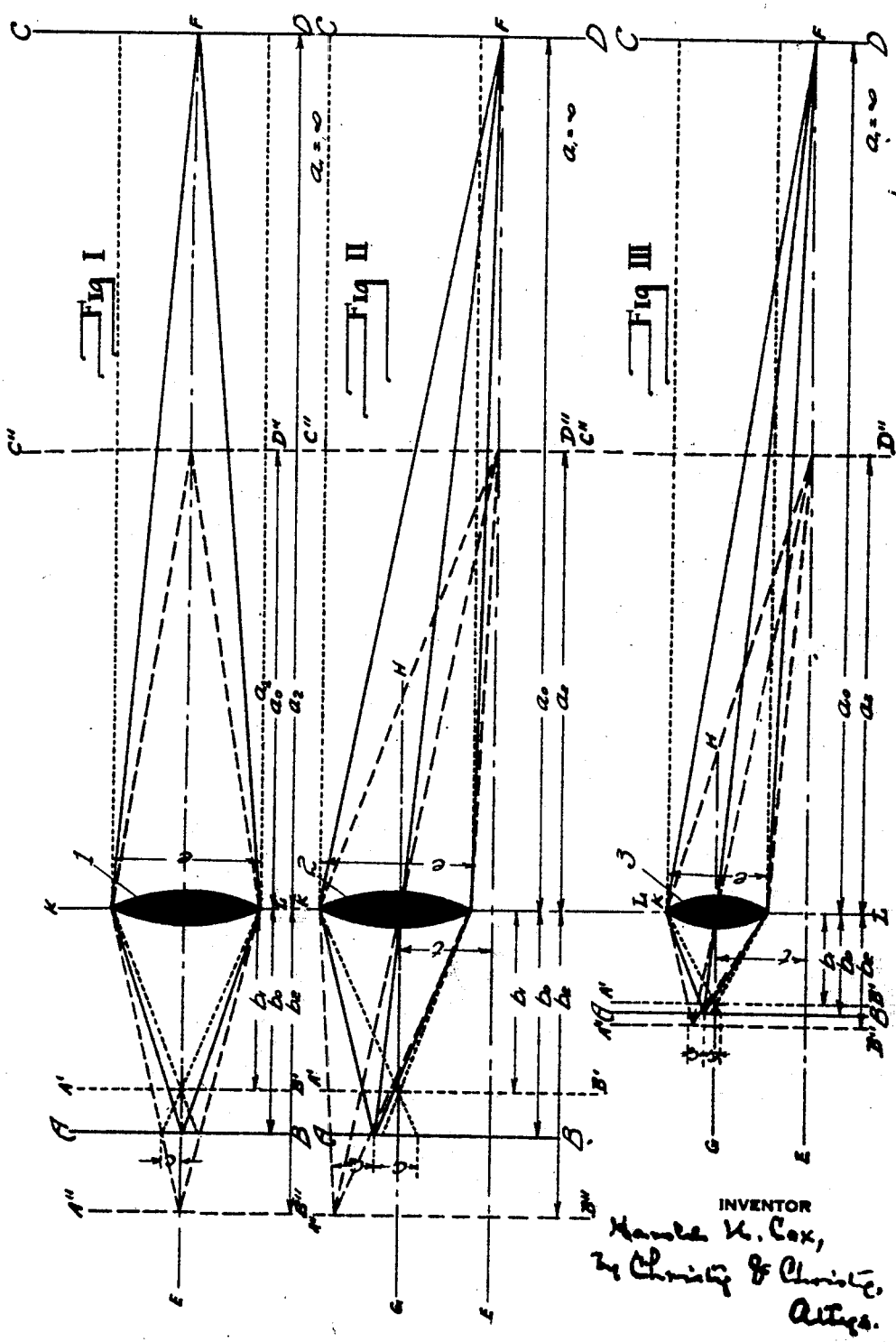

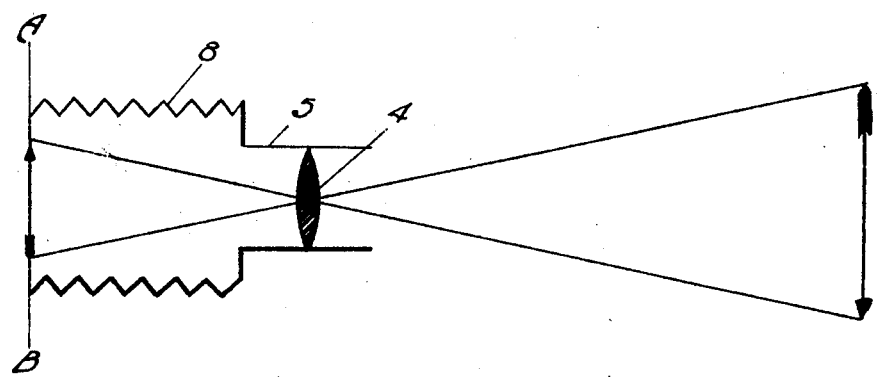
Fig. IV.
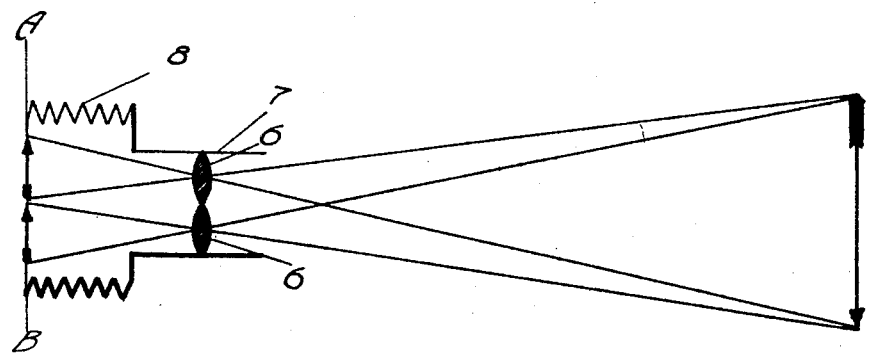
Fig. V.
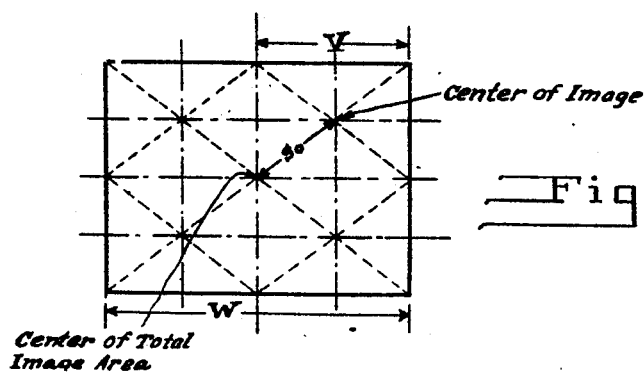
Fig. VI.

1,811,495

UNITED STATES PATENT OFFICE

HAROLD N. COX, OF GLEN RIDGE, NEW JERSEY, ASSIGNOR TO COX MULTI-COLOR PHOTO COMPANY, OF PITTSBURGH, PENNSYLVANIA, A CORPORATION OF DELAWARE

MULTIPLE-IMAGE CAMERA

Application filed July 25, 1928. Serial No. 295,256.

My invention relates to improvements in multiple-image cameras and consists in a lens system for multiple-image work capable of being substituted in a given camera for the usual single-image lens, and when so substituted capable of affording a plurality of images in which aberration due to parallax as well as to the optical properties of the lenses is not greater than the aberration which in the single-image system is due solely to the optical properties of the lens.

In the accompanying drawings Figs. I, II, and III are diagrams illustrative of the ensuing discussion; Figs. IV and V are diagrammatic views in longitudinal section of a camera in which a single-image lens system and a multiple-image system are alternately used; and Fig. VI is a diagram illustrative of the placement of the images upon the film in the use of the multiple-image system.

Referring first to Fig. I, a single lens 1, whose focal length is indicated at $b_1$, may be understood to be associated with a sensitive film situated in the plane A—B. The relative positions are such that the lens is focused on an object situated in the plane C—D. Parallel rays from a point at an infinite distance, converging to the principal focus of the lens and prolonged until they intersect the plane A—B, produce a diffused image, and the distance $c$ is a measure of the aberration. The plane A—B is the plane so situated that the aberration $c$ is of maximum permissible value. There is a plane intermediate between the plane C—D and the lens so situated that the image of an object disposed in that plane will by the lens 1 be projected in plane A—B with aberration the same as the aberration of the image of an object remote from the lens an infinite distance, the aberration being measured by the distance $c$. That plane will be found to be distant from the lens one half the distance at which the plane C—D is remote from the lens, and the distance at which this intermediate plane is remote from the lens 1, that is to say, one half of the distance at which the plane C—D is remote from lens 1 is the hyperfocal distance.

In Fig. II the lens 2 may be understood to be one of a plurality of simultaneous lenses situated equidistantly about an axis and adapted to project multiple images upon a film in the plane A—B. The lens 2 is of equal focal length with lens 1 of Fig. I. In this case the aberration due to the optical properties of the glass is augmented by aberration due to parallax; that is to say, to the displacement of the lens 2 from the axis of the system, and it may be understood that the aberration is increased beyond permissible limits.

In Fig. III the focal length of the lens element 3 is shortened ($=b_1$), and, the film being brought to the plane A—B, to bring to focus an object in the plane C—D, it will be perceived that the aberration, due both to the optical properties of the lens and to parallax, is less than in the case of Fig. II. And I have found that by reducing the focal length of the simultaneous lenses 3 I may with a given film area and a given lens aperture produce simultaneous images in which aberration is reduced to the permissible limit, indicated at $c$, Fig. I.

In consequence of the reduction in focal length, the depth of focus of the simultaneous lens elements, individually considered, is increased. When a lens is situated as these simultaneous lens elements are situated, remote from the axis, the depth of focus is in effect diminished; but compensation for such diminution in depth of focus is found in decrease of focal length; and the practical depth of focus of the system is, in consequence of the reduction of focus, not less than that of the single-image system.

Referring to Figs. IV and V the single lens 4 of Fig. IV and the simultaneous lenses 6 of Fig. V are carried in the lens barrels 5 and 7, and these, it will be perceived are interchangeable in their position in the camera 8. The bringing of the simultaneous lenses within the arrow compass of the lens barrel is itself advantageous, because the less the interval at which these lens elements stand axially apart, the smaller the parallax. Additionally, the diminution in the focal length of the simultaneous lenses, in which my invention resides, brings about elimination of aberration, as I have already described.

Whether the elmination of the effect due to the separation of the lenses (i. e. parallax) be complete or not, will depend upon the spacing of the images and upon the focal lengths and apertures of the lenses. The condition for complete elimination is shown by a comparison of the hyperfocal distances of the two systems (i. e. the single-image and the multiple-image systems).

In these systems of multiple-image color photography, wherein each image is formed by a different lens, parallax exists, owing to the necessary separation of the lenses. The practical effect of the existence of parallax is that the depth of field of the assembled lenses is less than that of a single lens of the same focal length and the same effective aperture as the lenses of the multiple-image system. That this last statement is true is shown diagrammatically in Figs. I, II, and III in each of which a simple lens is made to represent a photographic objective.

Referring first to Fig. I, which represents a single-image system, the rays from an axial point in the object plane C D are brought to focus by the lens at an axial point in the plane of the film A B. The rays from an axial point at an infinite distance come to focus at an axial point in the plane A' B'; but, after passing this plane, they diverge to form, in the plane A B, a diffused image whose farthest edge is at the distance $c$ from the axis E F. The rays from an axial point in the plane C'' D'' will come to focus at an axial point in the plane A'' B''; and, in passing the plane of the film A B, there will form in that plane a diffused image whose farthest edge is also at the distance $c$ from the axis E F, the spacing having been so chosen as to produce such equality in aberration. Taking the allowable limit of aberration as measured by the dimension $c$, it is evident that sufficiently sharp image definition will be obtained for all axial object points between the planes C'' D'' and infinity. In other words, all points within the limits named will be "in focus." The distance $a_2$ between the lens and the plane C'' D'' is the hyper-focal distance; the distance between the planes A' B' and A'' B'' is the depth of focus; and the distance between the plane C'' D'' and the farthest plane in focus is the depth of field.

Since the less the hyper-focal distance the greater the depth of field, the former is an inverse measure of the latter.

From Fig. I we derive the following relations:

$$\frac{2c}{e} = \frac{b_0 - b_1}{b_1} \text{ and } b_1 = f$$

in which $f$ = the focal length of the lens. Then since, from the relation $$f = \frac{a_0 b_0}{a_0 + b_0}, \quad b_0 = \frac{a_0 f}{a_0 - f};$$

we obtain, by solving for $a_0$, $$a_0 = \frac{f(e + 2c)}{2c}. \quad \text{(Equation 1.)}$$

From Fig. I, also, we obtain the relation:

$$\frac{2c}{e} = \frac{b_2 - b_0}{b_2}.$$

Since $$b_2 = \frac{a_2 f}{a_2 - f} \text{ and } b_0 = \frac{a_0 f}{a_0 - f},$$

$$a_2 = \frac{f(e + 2c)}{4c}. \quad \text{(Equation 2.)}$$

Fig. II shows one of the lenses of a multiple-image system which it is assumed has replaced the single-image system of Fig. I, the lenses of the two systems having the same focal length $f$ and the same effective aperture $e$. The axes GH of the lenses of the multiple-image system have been displaced a distance $t$ from, but remain parallel to, the axis E F of the single lens which the multiple-image system has replaced, and the axis E F becomes the axis of symmetry of the multiple-image system. In the plane A B of the film, the farthest edge of the diffused image of an axial object point at infinity is the distance $c_1$ from the point taken as the center of the image (which point is coordinate to the axial object point in the plane C D) and $c_2$ is the corresponding distance for an axial object point in the plane C'' D''. When $c_1 = c_2$, the plane C'' D'' is at the hyper-focal distance from the multiple lens. The difference between $c_1$ or $c_2$ of Fig. II and $c$ of Fig. I is due to parallax. The effect of parallax is made evident by imperfect superimposition, when the images are projected upon a screen.

From Fig. II we obtain the relations:

$$\frac{2(s_1 - s_0 + c_1)}{e} = \frac{b_0 - b_1}{b_1}, \frac{t}{s_0} = \frac{a_0}{a_0 + b_0}, b_1 = f \text{ and } s_1 = t$$

in which $f$ = the focal length of the lenses, only one of which is shown. $s_1$ is the distance at which the center of each multiple lens is remote from the axis EF of the system; $s_0$ is the distance from the axis EF of the point at which a ray of light emanating from F and passing through the center of the lens 2 would intersect the plane AB; $s_2$ is the distance from the axis EF of the point at which a ray of light emanating from the point of intersection of the principal axis EF with the hyper-focal plane $C''\,D''$ and passing through the center of the lens 2 would intersect the plane AB. Since $$b_0 = \frac{a_0 f}{a_0 - f},$$

we obtain $$a_0 = \frac{f(e + 2t + 2c_1)}{2c_1}. \quad \text{(Equation 3.)}$$

In Fig. II, also, we find the relations:

$$\frac{2(s_0 + c_2 - s_1)}{e} = \frac{b_2 - b_0}{b_2} \text{ and } \frac{t}{s_2} = \frac{a_2}{a_2 + b_0}.$$

Since $$b_0 = \frac{a_0 f}{a_0 - f} \text{ and } b_2 = \frac{a_2 f}{a_2 - f},$$

we find that $$a_2 = \frac{f(e + 2t + 2c_2)}{4c_2}. \quad \text{(Equation 4.)}$$

By comparing Equations 1 and 3 with Equations 2 and 4 when $c_1 = c_2 = c_1$, it will be noted that in both the single- and multiple-image systems the hyper-focal distance $a_2$ is equal to one half the distance $a_0$ between the lens and the object plane for which the lens is focused. It is evident also that, when $t=0$, Eq. 4 becomes Eq. 2.

In a multiple-image system so constructed that, in comparison with a given single-image system, the same angle of view is obtained and the several images are confined to within the same total image area, it is necessary to use lenses of shorter focal length, because each image is smaller. Therefore, since reduced focal length gives greater depth of field, the effect of parallax is at least partly eliminated.

This is demonstrated by the multiple-image system of Fig. III, only one lens of which is shown and in which the lenses of Fig. II have been replaced by lenses of the same numerical aperture but of one half the focal length. The displacement $t$ has not been changed and the hyper-focal distance is the same as that of Figs. I and II. By comparison with Fig. I it will be noted that each of aberrations $c_1$ and $c_2$ is equal to one half the aberration $c$ of the single-image system.

Whether or not the elimination of the effect of parallax is complete depends upon the displacement, in the case of the multiple-image system, and upon the focal lengths and the effective apertures of the lenses of the systems compared. The condition for complete elimination is shown by a comparison of the hyper-focal distances of the two systems, since hyper-focal distance is an inverse measure of depth of field.

The hyper-focal distance of a single-image system is equal to $$\frac{f_s(e_s + 2c_s)}{4c_s}$$

(from Eq. 3, the subscripts $s$ having been added to the symbols to distinguish them from the symbols pertaining to the multiple-image system) in which $f_s$ denotes the focal length of the single lens, $e_s$ denotes the diameter of effective aperture and $c_s$ denotes the maximum allowable radius of the diffused image of an axial object point. The hyper-focal distance of a multiple-image system is equal to $$\frac{f_m(e_m + 2t + 2c_m)}{4c_m}$$

(from Eq. 4, the subscript $m$ having been added) in which $f_m$ denotes the focal length of lenses of the multiple-image system, $e_m$ denotes the diameter of effective aperture, $c_m$ denotes the maximum allowable distance for the farthest edge of the diffused image of an axial object point from the center of the image, and $t$ denotes the distance of the axes of the lenses from the axis of symmetry of the system.

The condition, then, for equality of depth of field in the two systems is given by the equation:

$$\frac{f_s(e_s + 2c_s)}{c_s} = \frac{f_m(e_m + 2t + 2c_m)}{c_m} \quad \text{(Equation 5.)}$$

Let $w$ denote the width of image in the single-image system, let $v$ denote the width of image in the multiple-image system, and let $$k = \frac{w}{v}.$$

Then, in order to preserve in the two systems the same aberration on the screen during projection, put $c_s = kc_m$. Substituting $kc_m$ for $c_s$ in Eq. 5, we have $$f_s e_s = k f_m(e_m + 2t + 2c_m) \quad \text{(Equation 6.)}$$

A simpler equation applies to the comparison of the single- and multiple-image systems in which the objectives are divided into two members, the back member having a focal length $f$ equal to its distance from the image plane and the front member having a focal length $f'$ equal to its distance from the object plane. From the relations $$b_0 = f, \; a_0 = f', \; b_1 = \frac{a_0 f}{a_0 + f}, \; \frac{2c}{e} = \frac{b_0 - b_1}{b_1}$$

$$\text{and } \frac{2c}{e} = \frac{b_2 - b_0}{b_2},$$

the hyperfocal distance of the single-image system is found to be equal to $$\frac{f_s e_s}{4c_s}$$

(after adding subscripts $s$) and, from the relations $$\frac{2(s_1-s_0+c_1)}{e}=\frac{b_0-b_1}{b_1}, \quad \frac{2(s_0+c_2-s_2)}{e}=\frac{b_2-b_0}{b_2} \text{ and } s=t,$$

the hyperfocal distance of the multiple-image system is found to be equal to $$\frac{f_m(e_m+2t)}{4c_m}$$

(after adding subscripts $m$ and putting $c_1=c_2=c_m$). Then, in systems of this type, the condition for equality of depth of field is given by the equation:

$$\frac{f_s e_s}{c_s}=\frac{f_m(e_m+2t)}{c_m}$$

from which $c_s$ and $c_m$ are eliminated and $k$ introduced when the equation corresponding to Eq. 6 is derived and we have $$f_s e_s = k f_m(e_m+2t) \quad \text{(Equation 7.)}$$

In Eq. 6, $c_m$ is so small in comparison with $e_m$ that for the distances of object plane encountered in practice, a negligible error is introduced by putting $c_m=0$. Eq. 6 then becomes Eq. 7 which is applicable to both types of systems.

It is evident that, if the quantity represented by any of the symbols in the right-member of Eq. 7 be increased above that necessary for equality, then the hyperfocal distance of the multiple-image system will be the greater and therefore its depth of field will be less than that of the single-image system. Therefore, if the equation be solved for $k$, $f_m$, $e_m$, or $t$, the other quantities being known, the result will express the maximum value for screen aberration not greater in the multiple-image system than in the single-image system.

Special forms of Eq. 7 may be derived for showing the relations, for example, when the angles of view and the numerical apertures are equal in the two systems and when the application is to a four-image system.

A multiple-image system will have the same angle of view as that of a given single-image system when $f_s=kf_m$. Substituting $kf_m$ for $f_s$ in Eq. 7 we have $$kf_m e_s = kf_m(e_m+2t).$$

Eliminating $kf_m$ and solving for $e_m$, $$e_m = e_s - 2t \quad \text{(Equation 8.)}$$

the meaning of which may be expressed as follows: The screen aberration of a multiple-image system is not greater than that of a given single-image system, having the same angle of view, when the diameter of the effective aperture of each of the lenses of the former is not greater than the diameter of the effective aperture of the latter less twice the distance of the axes of the lenses of the former from the axis of symmetry of the system.

The dimension $t$ depends upon the dimensions of the total image area and upon the number and arrangement of the images of the multiple-image system. Fig. VI shows the image disposal of a four-image system whose total image area is equal to that of the single-image system and in which each image is one half the width $w$ and one half the height of the total image area. Let the height, in each case, equal three fourths of the width. Then $s_0$, the distance between the center of the total image area and the center of the image, is equal to $$\frac{5w}{16}.$$

But, for the purpose at hand, we may put $s_0=t$ because when, as in the systems shown in Figs. I, II, and III, $s_0$ is not equal to $t$, their difference is, in practice, negligible in comparison with $w$. Taking, then, $$t=\frac{5w}{16}$$

and substituting in Eq. 8 we obtain $$e_m = e_s - \frac{5w}{8} \quad \text{(Equation 9)}$$

from which may be calculated the maximum allowable diameter of effective aperture for a four-image system when the effective aperture and width of image of the single-image system are known.

For single- and multiple-image systems, having the same numerical aperture and the same angle of view, $f_s=kf_m$ and $$\frac{e_s}{f_s}=\frac{e_m}{f_m}.$$

Then $e_s=ke_m$. Substituting in Eq. 8 and solving for $e_m$, we have $$e_m=\frac{2t}{k-1} \quad \text{(Equation 10.)}$$

In the four-image system of Fig. VI, $k=2$ and Eq. 10 becomes $$e_m = 2t \quad \text{(Equation 11)}$$

which, in this case, is the maximum value for the effective aperture of the four-image system because the effective apertures of the two systems change in the same ratio.

Let $n_m$ denote the numerical aperture. Substitute $$\frac{f_m}{n_m}$$

for $e_m$ in Eq. 11 and solve for $n_m$. Then $$n_m=\frac{f_m}{2t} \quad \text{(Equation 12)}$$

which is a maximum value because $n_m$ and $e_m$ have a reciprocal relation.

Putting
$$t = \frac{5w}{16},$$

Eq. 12 becomes
$$n_m = \frac{8f_m}{5w}$$

which means that the screen aberration of the four-image system of Fig. VI is not greater than that of a given single-image system, having the same angle of view and the same numerical aperture, when the numerical aperture of each of the lenses of the former is not greater than eight times the focal length divided by four times the width of the total image area.

Since this equation 12 expresses the conditions under which the depths of focus are equal in the two systems when the angles of view and numerical apertures are equal, it is evident that there are other conditions under which the depth of focus of the multiple-image system may be greater than that of the single-lens system replaced. Even if lenses and stops are so chosen as to decrease the depths of focus as compared with a single lens system, the difference is so small that I have found it to be not objectionable.

By changing the ratio of the focal length of the lenses in the same proportion as the images are reduced, as compared with a single-lens system, I have found that the depth of focus may under particular conditions be as great as in the single-lens system.

I claim as my invention:

A lens system for multiple-image work adapted to serve interchangeably with a single-image lens of given focal length and width of aperture, and to project upon a film and within the area covered by the single-image lens multiple-images of equal angle of view, such system including a plurality of identical lens units, of fixed aperture symmetrically spaced about an axis, the focal length of which lenses is substantially $$\tfrac{5}{8} n \times w,$$

in which $n$ = the numerical aperture of the lens units of the multiple-image system, and $w$ = the width of the film area.

In testimony whereof I have hereunto set my hand.

HAROLD N. COX.